(12) United States Patent
Chng et al.

(10) Patent No.: US 9,471,109 B1
(45) Date of Patent: Oct. 18, 2016

(54) SELECTIVE OVERRIDE OF TOUCH DISPLAY INPUTS

(71) Applicant: GOOGLE INC., Mountain View, CA (US)

(72) Inventors: Choon Ping Chng, Sunnyvale, CA (US); Christopher Lyon, Santa Clara, CA (US); Puneet Kumar, Saratoga, CA (US); Mark David Hayter, Menlo Park, CA (US); Rachel Nancollas, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1 day.

(21) Appl. No.: 14/550,284

(22) Filed: Nov. 21, 2014

Related U.S. Application Data

(60) Provisional application No. 61/921,933, filed on Dec. 30, 2013.

(51) Int. Cl.
*G06F 1/16* (2006.01)

(52) U.S. Cl.
CPC ........... *G06F 1/1677* (2013.01); *G06F 1/1616* (2013.01)

(58) Field of Classification Search
CPC .. G06F 3/0338; G06F 3/0346; G06F 3/0354; G06F 1/1677; G06F 1/1616
See application file for complete search history.

(56) References Cited

U.S. PATENT DOCUMENTS

| | | | |
|---|---|---|---|
| 6,492,974 B1 * | 12/2002 | Nobuchi | G06F 1/1618 345/156 |
| 8,345,025 B2 | 1/2013 | Seibert et al. | |
| 8,786,409 B2 * | 7/2014 | Zwart | G06F 1/1601 340/12.1 |
| 2009/0061947 A1 * | 3/2009 | Park | G06F 1/1624 455/566 |
| 2009/0100384 A1 * | 4/2009 | Louch | G06F 1/1626 715/863 |
| 2009/0144574 A1 * | 6/2009 | Tseng | G06F 1/1616 713/323 |
| 2010/0210216 A1 | 8/2010 | Westlund | |
| 2010/0321286 A1 * | 12/2010 | Haggerty | G06F 3/0418 345/156 |
| 2011/0179864 A1 | 7/2011 | Raasch et al. | |
| 2012/0015671 A1 * | 1/2012 | Lada | G06F 1/1616 455/456.1 |
| 2012/0105358 A1 | 5/2012 | Momeyer et al. | |
| 2013/0176264 A1 * | 7/2013 | Alameh | G06F 3/038 345/174 |
| 2015/0009187 A1 * | 1/2015 | Mercea | G06F 3/0346 345/179 |

OTHER PUBLICATIONS

Hill, "9 Tips and Tricks to Make the Most of Your Moto X", Oct. 4, 2013, 7 pages.

* cited by examiner

*Primary Examiner* — Tom Sheng
(74) *Attorney, Agent, or Firm* — Brake Hughes Bellermann LLP

(57) ABSTRACT

In one general aspect, a method can include receiving, by a computing device, an indication of movement of the computing device, receiving, by the computing device, an input from one of a touchpad, a touch-sensitive surface of a lid portion of the computing device, a trackpad, one or more mouse buttons, and a keyboard during the movement of the computing device, determining, based on the received indication of the movement of the computing device, that the received input is a false input, and ignoring, by the computing device, the received input based on determining that the received input is a false input.

23 Claims, 10 Drawing Sheets

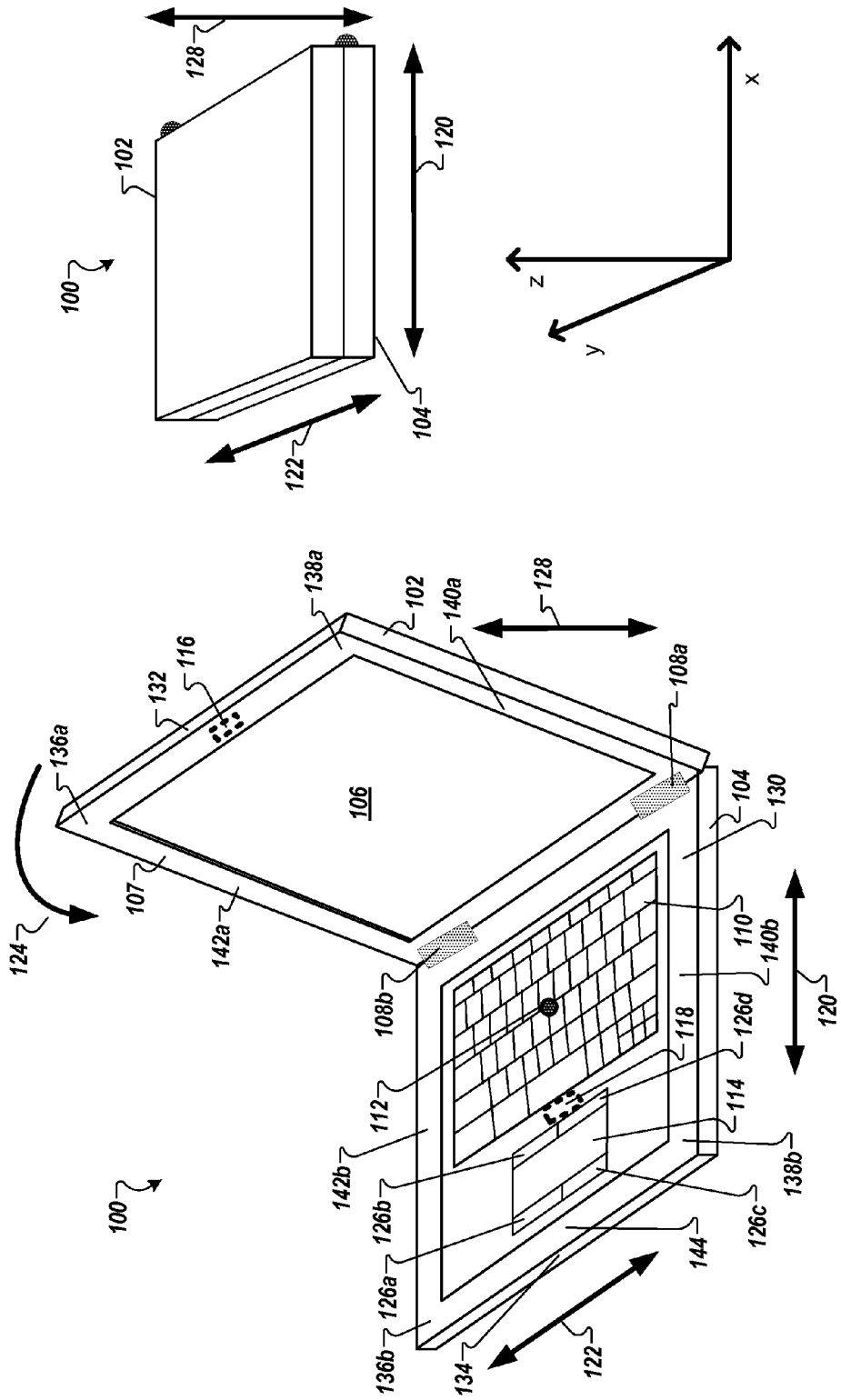

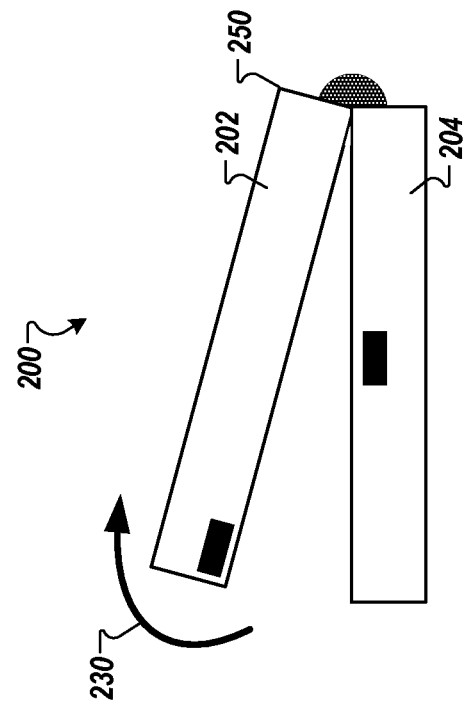
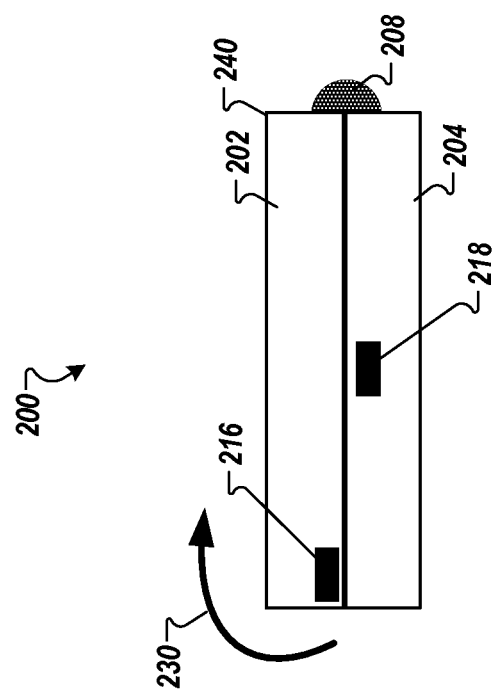
FIG. 2B
FIG. 2A

SELECTIVE OVERRIDE OF TOUCH DISPLAY INPUTS

CROSS REFERENCE TO RELATED APPLICATION

This application is a Nonprovisional of, and claims priority to, U.S. Patent Application No. 61/921,933, filed on Dec. 30, 2013, entitled "SELECTIVE OVERRIDE OF TOUCH DISPLAY INPUTS", which is incorporated by reference herein in its entirety.

TECHNICAL FIELD

This description generally relates to computing devices. The description, in particular, relates the use of accelerometers in a computing device.

BACKGROUND

Computing devices can provide a user with multiple ways to control the operations of and to input data to a computing device. A computing device can include, for example, a touchscreen display, a keyboard, a mouse, a trackpad, a touchpad, a pointing stick, one or more mouse buttons, a trackball, a joystick, and other types of input devices. A user of the computing device can interact with one or more of these input devices when providing input to and/or otherwise controlling the operation of an application running on the computing device. For example, the user may interact with the computing device by making direct contact with (e.g., touching with one or more fingers) the touchscreen.

As computing devices become smaller, the available area on the computing device for these inputs devices may be reduced. For example, a laptop or notebook computer may include a lid and a base. The lid may include a display (which can be a touchscreen) that may occupy substantially the entire surface area of one side of the lid of the computing device. In addition, some laptop or notebook computers may include a lid having a touchscreen within an area that extends beyond the area of the display, for example, over a bezel that surrounds the display. The base may include one or more of, for example, a keyboard, a pointing stick, mouse buttons, a touchpad, and/or a trackpad. These input devices can occupy a large portion of the base of the computing device.

A user handling the computing device may inadvertently touch an input device on the base of the computing device or touch the touchscreen in the lid of the computing device when they did not intend to provide any type of input to the computing device. For example, a user closing the lid of the computing device may touch the touchscreen. In another example, a user moving their computing device on their desk may touch one or more of the input devices on the base of the computing device. Thus, a need exists for systems, methods, and apparatus to address the shortfalls of present technology and to provide other new and innovative features.

SUMMARY

In one general aspect, a method can include receiving, by a computing device, an indication of movement of the computing device, receiving, by the computing device, an input from one of a touchpad, a touch-sensitive surface of a lid portion of the computing device, a trackpad, one or more mouse buttons, and a keyboard during the movement of the computing device, determining, based on the received indication of the movement of the computing device, that the received input is a false input, and ignoring, by the computing device, the received input based on determining that the received input is a false input.

Example implementations may include one or more of the following features. For instance, the lid portion of the computing device may include a first accelerometer and a base portion of the computing device may include a second accelerometer. Receiving an indication of movement of the computing device may include receiving first data from the first accelerometer and second data from the second accelerometer. The method may further include analyzing the first data and the second data, and determining, based on analyzing the first data and the second data, that the lid portion of the computing device is moving relative to the base portion of the computing device.

The method may further include determining, based on determining that the lid portion of the computing device is moving relative to the base portion of the computing device, that the movement of the computing device is a closing of the computing device. The method may further include determining, based on analyzing the first data and second data, that the base portion of the computing device is stationary and in a horizontal position. The method may further include determining, based on determining that the lid portion of the computing device is moving relative to the base portion of the computing device, that the movement of the computing device is an opening of the computing device. The method may further include determining, based on analyzing the first data and the second data, that the base portion of the computing device is stationary and in a horizontal position.

The lid portion of the computing device may include a first accelerometer and a base portion of the computing device may include a second accelerometer. Receiving an indication of movement of the computing device may include receiving first data from the first accelerometer and second data from the second accelerometer. The method may further include analyzing the first data and the second data, and determining, based on analyzing the first data and the second data, that the lid portion of the computing device and the base portion of the computing device are accelerating at the same rate.

In another general aspect, a computing device may include a lid portion including a first accelerometer and a touch-sensitive surface, the touch-sensitive surface including a touch-sensitive bezel and a touch-sensitive display area, wherein the touch-sensitive bezel at least partially overlaps the touch-sensitive display area, a base portion coupled to the lid portion and including a second accelerometer, and a non-transitory computer-readable medium having instructions stored thereon, the instructions, when executed by a processor, causing at least one processor of the computing device to perform operations. The operations can include receiving first data from the first accelerometer and second data from the second accelerometer, determining, based on analyzing the first data and the second data, that the base portion is stationary and that the lid portion is moving relative to the base portion, receiving, from the touch-sensitive surface, input data representative of an input to the computing device, determining, based on determining that the lid portion is moving relative to the base portion, that the input to the computing device is a false input, and ignoring the input data based on determining that the input to the computing device is a false input.

Example implementations may include one or more of the following features. For instance, receiving, from the touch-sensitive surface, input data representative of an input to the computing device may include receiving input data representative of an input to the computing device that would cause an application executing on the computing device to perform an action. Ignoring the input data may include preventing the application from performing the action. Receiving, from the touch-sensitive surface, input data representative of an input to the computing device may include receiving input data representative of an input to the computing device that would cause an application to begin executing on the computing device. Ignoring the input data may include preventing the application from executing. The operations may further include measuring a change in an angle of movement of the lid portion relative to the stationary base portion, and determining, based on the measured change in the angle of movement, that the lid portion is being rotated about an axis relative to the base portion.

Determining, based on the measured change in the angle of movement, that the lid portion is being rotated about an axis relative to the base portion may include determining that the computing device is being closed. The computing device may be transitioned from a first power state to a second, lower power state once the computing device is closed. Determining, based on the measured change in the angle of movement, that the lid portion is being rotated about an axis relative to the base portion may include determining that the computing device is being opened. The computing device may be transitioned from a first power state to a second, higher power state once the computing device is opened.

In yet another general aspect, a computing device can include a lid portion including a first accelerometer, a base portion coupled to the lid portion and including a second accelerometer and one or more input devices, and a non-transitory computer-readable medium having instructions stored thereon, the instructions, when executed by a processor, causing at least one processor of the computing device to perform operations. The operations can include receiving first data from the first accelerometer and second data from the second accelerometer, determining, based on analyzing the first data and the second data, that the base portion is stationary and that the lid portion is moving relative to the stationary base portion, receiving, from a one of the one or more input devices, input data representative of an input to the computing device, determining, based on determining that the lid portion is moving relative to the stationary base portion, that the input to the computing device is a false input, and ignoring the input data based on determining that the input to the computing device is a false input.

Example implementations may include one or more of the following features. For instance, the one or more input devices may include a touchpad, a trackpad, one or more mouse buttons, and a keyboard. Receiving, from a one of the one or more input devices, input data representative of an input to the computing device may include receiving input data representative of an input to the computing device that would cause an application executing on the computing device to perform an action. Ignoring the input data may include preventing the application from performing the action. Receiving, from a one of the one or more input devices, input data representative of an input to the computing device may include receiving input data representative of an input to the computing device that would cause an application to begin executing on the computing device. Ignoring the input data may include preventing the application from executing.

The operations may further include measuring a change in an angle of movement of the lid portion relative to the stationary base portion and determining, based on the measured change in the angle of movement, that the lid portion is being rotated about an axis relative to the base portion. Determining, based on the measured change in the angle of movement, that the lid portion is being rotated about an axis relative to the base portion may include determining that the computing device is being closed. The computing device may be transitioned from a first power state to a second, lower power state once the computing device is closed. Determining, based on the measured change in the angle of movement, that the lid portion is being rotated about an axis relative to the base portion may include determining that the computing device is being opened. The computing device may be transitioned from a first power state to a second, higher power state once the computing device is opened.

The details of one or more implementations are set forth in the accompanying drawings and the description below. Other features will be apparent from the description and drawings, and from the claims.

BRIEF DESCRIPTION OF THE DRAWINGS

FIG. 1A is a diagram that illustrates an example computing device in an open position.

FIG. 1B is a diagram that illustrates a side view of an example computing device when in a closed position.

FIGS. 2A-B are diagrams that illustrate a side view of an example computing device in a closed position and in a slightly opened position, respectively.

Like reference symbols in the various drawings indicate like elements.

DETAILED DESCRIPTION

Figure 3:
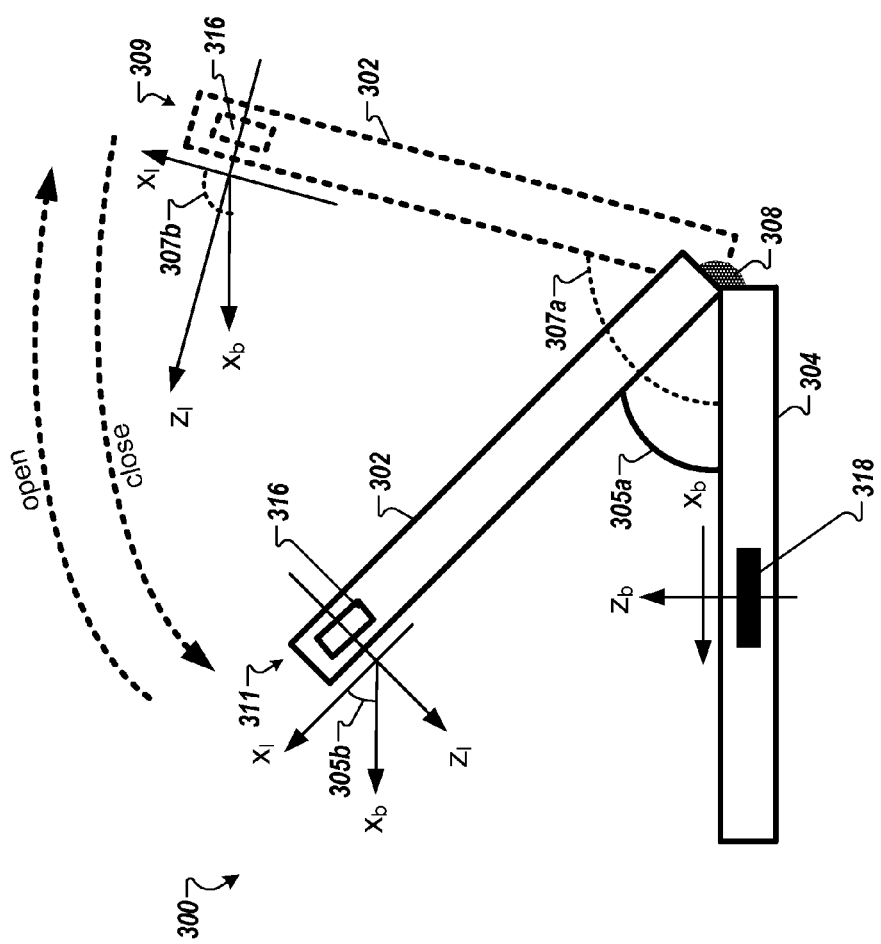
FIG. 3 is a diagram that illustrates the axes of a lid accelerometer and a base accelerometer.

FIG. 1A is a diagram that illustrates an example computing device 100 in an open position, according to an implementation. In this implementation, the computing device 100 includes a lid portion 102 and a base portion 104. The base portion 104 includes an input area 130. The lid portion 102 includes a display area 106. A bezel 107 surrounds the display area 106. The bezel 107 supports the display area 106 and houses electrical and optical components that allow the display area 106 to function. In general, the bezel 107 may not be used to display information in the same way that the display area 106 displays information. The display area 106 can include a touch-sensitive display device (e.g., a touchscreen) that is part of (or mounted on) the lid portion 102 of the computing device 100.

In some implementations, the display area 106 and the bezel 107 can each be touch-sensitive such that the display area 106 and the surrounding bezel 107 together form a touch-sensitive surface of the lid. As such, a touch-sensitive area of the lid portion 102 can at least partially overlap the display area 106. A touch-sensitive area of the lid portion 102 can be defined as incorporating (formed by) the display area 106 and all (at least a majority of) the surrounding bezel 107. In some implementations, the bezel 107 is not touch-sensitive. In these implementations, the touch-sensitive surface of the lid is defined (formed) by the display area 106 alone.

The input area 130 includes multiple input devices, such as a keyboard 110, a trackpad 114, a pointer button 112, and mouse buttons 126*a-d*. A user can interact with one or more of the multiple input devices when providing input to and/or otherwise controlling the operation of an application running on the computing device 100. In addition or in the alternative, a user can interact with the computing device 100 by making direct contact with (e.g., touching with one or more fingers) the touch-sensitive surface of the lid portion 102 when providing input to and/or otherwise controlling the operation of an application running on the computing device 100.

The computing device 100 includes a lid accelerometer 116 and a base accelerometer 118. In general, accelerometers (e.g., lid accelerometer 116 and base accelerometer 118) can detect movement (motion) of the computing device 100 by measuring acceleration (the rate of change of velocity with respect to time). In some implementations, the detected acceleration can be integrated over time to determine a velocity and/or motion of the computing device 100. Types of accelerometers include, but are not limited to, capacitive accelerometers, piezoelectric accelerometers, piezoresistive accelerometers, Hall Effect accelerometers, magnetoresistive accelerometers, heat transfer accelerometers, and Micro-Electro Mechanical System (MEMS) based accelerometers.

A capacitive accelerometer can sense a change in electrical capacitance with respect to acceleration. A piezoelectric accelerometer can sense electrical potential generated by, for example, a crystal because of an applied stress (e.g., acceleration). A piezoresistive accelerometer can measure a resistance of a material when mechanical stress (acceleration) is applied. A Hall Effect accelerometer can measure voltage variations resulting from a change in a magnetic field that surrounds the accelerometer. A magnetoresistive accelerometer can measure resistance variations resulting from a change in a magnetic field that surrounds the accelerometer. A heat transfer accelerometer can measure internal changes in heat transfer within the accelerometer due to acceleration.

The lid accelerometer 116 and the base accelerometer 118 can be configured to detect changes in vibrations, or patterns of vibrations occurring in an ambient environment of the computing device 100, such as may be caused by footsteps of a person or persons walking near the computing device 100. In addition or in the alternative, the lid accelerometer 116 and the base accelerometer 118 can be configured to detect movement of the computing device 100. The detected movement can be an amount of motion (e.g., how far the computing device 100 is moved). The detected movement can be a type of motion imparted to the computing device 100 (e.g., twisting or rotating, moving side-to-side or back and forth). The detected motion can be movement of one portion of the computing device 100 relative to the other portion. For example, the lid portion 102 of the computing device 100 can be moved relative to the base portion 104 of the computing device 100. The detected movement of the computing device 100 can indicate a particular condition and/or usage of the computing device 100 at the time the movement is detected.

The computing device 100 as a whole can move in many directions. In addition, the lid portion 102 of the computing device 100 can move relative to the base portion 104, and the base portion 104 of the computing device 100 can move relative to the lid portion 102. Hinges 108*a-b* attach the lid portion 102 to the base portion 104 and allow movement of the lid portion 102 and the base portion 104 relative to one another. In all cases, the lid accelerometer 116 and the base accelerometer 118 can detect the movement of the computing device 100 as a whole as well as the movement of the lid portion 102 relative to the base portion 104 and the base portion 104 relative to the lid portion 102.

Accelerometers can measure acceleration in one, two, or three axes. For example, single-axis accelerometers can detect inputs along a single axis or plane (in a single dimension) (e.g., an x-axis). 2-axis accelerometers can detect inputs along a two axes or planes (in two dimensions) (e.g., an x-axis and a y-axis). Tri-axis accelerometers can detect inputs in all three axes or planes (in three dimensions) (e.g., an x-axis, a y-axis, and a z-axis).

In some implementations, a six-axis motion tracking device can include a tri-axis (3-axis) accelerometer and a tri-axis (3-axis) gyroscope. Combined, the tri-axis accelerometer and the tri-axis gyroscope can detect motion and orientation in a three dimensional space. The tri-axis accelerometer can measure/calculate acceleration in three axes while the tri-axis gyroscope can measure/calculate orientation and rotation in three axes.

FIG. 1B is a diagram that illustrates the example computing device 100 in a closed position. For example, the lid accelerometer 116 and the base accelerometer 118 can be tri-axis accelerometers. In general, a tri-axis accelerometer can detect acceleration along each of the three axes (e.g., x-axis 120, y-axis 122, and z-axis 128). The lid accelerometer 116 and the base accelerometer 118 can detect movement of the computing device 100 along an x-axis 120, a y-axis 122, and a z-axis 128.

An example of the detection of the movement of the computing device 100 along the x-axis by the lid accelerometer and/or the base accelerometer will be described with reference to FIG. 7. An example of the detection of the movement of the computing device 100 along the y-axis by the lid accelerometer 116 and/or the base accelerometer 118 will be described with reference to FIG. 8.

The lid accelerometer 116 and/or the base accelerometer 118 can detect movement of the computing device 100 along the z-axis, for example, as an up-and-down movement or motion of the computing device 100. For example, lifting and placing the computing device 100 on a flat surface can be detected as motion in at least the direction of the z-axis. In this example, the computing device 100 can detect the motion, and based on the detected motion, can transition and/or place the computing device 100 into a particular mode of operation. For example, the lid accelerometer 116 and/or the base accelerometer 118 can detect motion of the computing device 100 along the z-axis (e.g., the acceleration of the computing device 100 along the z-axis). Dependent on the detected degree of acceleration of the computing device 100, the computing device 100 may assume a user has moved the computing device 100, placed it on a flat surface (e.g., a table or desk), and is ready to interact with the computing device 100. If the computing device 100 was in a sleep or hibernate mode (or other type of reduced power mode), the computing device 100 can "wake-up" and transition into a full power mode (or other type of mode where the power consumption and capabilities of the computing device 100 increase). The transition can be in anticipation of the interaction of the user with the computing device 100.

In some cases, the accelerating movement of the computing device 100 can be attributed to gravity. Dependent on the detected degree of acceleration of the computing device 100 (e.g., the acceleration of the computing device 100 exceeds a threshold value) the computing device 100 may determine that it is being dropped. The computing device 100 may perform one or more operations in order to protect the computing device 100 from any adverse effects that may result when it is dropped.

The lid accelerometer 116 and the base accelerometer 118 can detect motion relative to the lid portion 102 and the base portion 104 of the computing device 100. For example, the base portion 104 of the computing device 100 can remain stationary while the lid portion 102 of the computing device 100 is moved (in a motion 124) towards the base portion 104. The motion 124 can indicate that the computing device 100 is being closed, where completion of the motion 124 results in the computing device 100 in the closed position, as shown in FIG. 1B.

In the implementation shown in FIG. 1A, the lid accelerometer 116 is located along a top edge 132 of the lid portion 102 and centered along the top edge 132 of the lid portion 102 of the computing device 100. In the implementation shown in FIG. 1A, the base accelerometer 118 is located in approximately the center of the base portion 104 (e.g., along-side or under the keyboard 110). Placing the lid accelerometer 116 and the base accelerometer 118 at these locations can result in the motion of the lid portion 102 having a large arc motion making the movement of the lid portion 102 relative to the base portion 104 (and the movement of the base portion 104 relative to the lid portion 102) more easily detectable. The ease of detection is in contrast to a small arc of motion when the lid accelerometer 116 and the base accelerometer 118 are located in closer proximity to the hinges 108a-b.

In some implementations, the lid accelerometer 116 can be included with circuitry for a camera module that may be located in the same position as the lid accelerometer 116 in the lid portion 102 of the computing device 100. In some implementations, the base accelerometer 118 can be included in circuitry for a motherboard included in the base portion 104 of the computing device 100. In these implementations, for example, the motherboard can be located under the keyboard 110.

In some implementations, the base accelerometer 118 and the lid accelerometer 116 can be located in other positions within the computing device 100. For example, the base accelerometer 118 can be centered along the front edge 134 of the base portion 104 of the computing device 100 (e.g., position 144). For example, the lid accelerometer 116 can be placed in a top upper left corner of the lid portion 102 (e.g., position 136a) and the base accelerometer 118 can be placed in a bottom front left corner of the base portion 104 (e.g., position 136b). For example, the lid accelerometer 116 can be placed in a top upper right corner of the lid portion 102 (e.g., position 138a) and the base accelerometer 118 can be placed in a bottom front right corner of the base portion 104 (e.g., position 138b). For example, the lid accelerometer 116 can be placed along a right edge of the lid portion 102 (e.g., position 140a) and the base accelerometer 118 can be placed along a right edge of the base portion 104 (e.g., position 140a). For example, the lid accelerometer 116 can be placed along a left edge of the lid portion 102 (e.g., position 142a) and the base accelerometer 118 can be placed along a left edge of the base portion 104 (e.g., position 142a). In these examples, and in general, the lid accelerometer 116 may be placed in positions within the bezel 107 of the computing device 100. In these examples, the base accelerometer 118 may be placed in positions outside of the input area 130 of the computing device 100. In some implementations, the base accelerometer 118 can be placed in a position close to or within the input area 130.

In some cases, the computing device 100 can receive input while detecting a movement of the computing device 100. The received input can include input detected by a tactile sensor (e.g., a touch-sensitive surface of the display area 106) included in the computing device 100. Based on the detected movement of the computing device 100, the computing device 100 can choose to ignore the received input.

In some cases, the computing device 100 may receive input slightly before the detected movement of the computing device 100. For example, a user of the computing device 100 may inadvertently touch (contact) an area of the touch-sensitive surface of the display area 106 when grasping the lid portion 102 of the computing device 100 in preparation to begin movement of the lid portion 102 towards the stationary base portion 104 (e.g., motion 124) in order to close the computing device 100. In these cases, based on detecting the movement of the computing device 100 shortly after (e.g., within a threshold amount of time) receiving the input, the computing device 100 can choose to ignore the received input.

In some cases, the computing device 100 may receive input concurrent with the detected movement of the computing device 100. For example, a user of the computing device 100 may inadvertently touch (contact) an area of the touch-sensitive surface of the display area 106 while closing the computing device 100 (moving the lid portion 102 towards the stationary base portion 104 (e.g., motion 124)). The area of the touch-sensitive surface of the display area 106 contacted by the user can correspond to an input to an application running on the computing device 100. The computing device 100 can use the data provided by the lid accelerometer 116 and the base accelerometer 118 to determine that the lid portion 102 of the computing device 100 is moving towards the base portion 104 of the computing device 100. Based on this detected motion, the computing device 100 can ignore the received input to the application.

In another example, a user of the computing device 100 may inadvertently touch (contact) one or more keys on the keyboard 110 while sliding the computing device 100 along a horizontal surface (e.g., move the computing device 100 in a direction along the x-axis and/or y-axis). The one or more keys contacted by the user can correspond to one or more inputs to an application running on the computing device 100. The computing device 100 can use the data provided by the lid accelerometer 116 and/or the base accelerometer 118 to determine that the computing device 100 is being moved. Based on the detected movement, the computing device 100 can ignore the received input to the application.

Referring to FIG. 1A, the motion 124 can close the computing device 100 resulting in the closed position for the computing device 100 as shown in FIG. 1B. In the closed position, the lid portion 102 and the base portion 204 can be in direct or nearly direct contact with one another. The lid accelerometer 116 and the base accelerometer 118 can detect motion relative to the lid portion 102 and the base portion 104 of the computing device 100. The computing device 100 can determine the detected motion is the closing of the computing device 100. In addition, the computing device 100 can determine when the detected motion is complete and the computing device is closed. Based on determining that the computing device 100 is closed, the computing device 100 may enter a state (e.g., a sleep state, a hibernation state) in which a user may no longer interact with an application running in the computing device 100.

FIGS. 2A-B are diagrams that illustrate a side view of an example computing device 200 in a closed position 240 and in a slightly opened position 250, respectively. For example, the computing device 200 can be the computing device 100, as shown in FIGS. 1A-B. A user can decide to open the computing device 200. Using a motion 230 to move a lid portion 202 of the computing device 200 away from a base portion 204 of the computing device 200 can result in a first position of the lid portion 202 relative to the base portion 204 of the computing device 200 as shown in FIG. 2B. The user can continue the motion 230 to completely open the computing device 200, which could result in the position of the computing device 200 as shown in FIG. 1A for the computing device 100. A lid accelerometer 216 and a base accelerometer 218 can detect the motion 230 to determine that a user is opening the computing device 200.

FIG. 3 is a diagram that illustrates axes ($x_l$, $z_l$) of a lid accelerometer 316 and axes ($x_b$, $z_b$) of a base accelerometer 318 of an example computing device 300. The example computing device 300 can be the computing device 100 in FIG. 1A. A z-axis ($z_l$) of the lid accelerometer 316 is perpendicular to a plane of the lid portion 302. An x-axis ($x_l$) of the lid accelerometer 316 is parallel to a plane of the lid portion 302. A z-axis ($z_b$) of the base accelerometer 318 is perpendicular to a plane of the base portion 304. An x-axis ($x_b$) of the base accelerometer 318 is parallel to a plane of the base portion 304.

In the example shown in FIG. 3, a base portion 304 of the computing device 300 can be in a stationary horizontal position and placed on a flat surface (e.g., the base portion is placed on a desktop or table). In a first position 309, the lid portion 302 is at an angle 307a relative to the base portion 304. The lid accelerometer 316 can provide information related to the acceleration of the movement of the lid portion 302 towards the base portion 304 and, in this example, to the placement of the lid portion 302 in a second position 311. In the second position 311, the lid portion 302 is at an angle 305a relative to the base portion 304.

In the example of FIG. 3, the computing device 300, having determined the placement (position and orientation) of the lid accelerometer 116 and the base accelerometer 118 (as shown in FIG. 3 by the axes ($x_l$, $z_l$) and the axes ($x_b$, $z_b$), respectively), can determine angle 307b and angle 305b. The angle 307b and the angle 305b are the relative angles between the x-axis ($x_l$) of the lid accelerometer 316 and the x-axis ($x_b$) of the base accelerometer 318. Based on determining the angle 307b and the angle 305b, the computing device 300 can determine the associated angle 307a and the associated angle 307b, respectively, as the angles between the lid portion 316 and the base portion 304 of the computing device 300.

Based on determining the relative angle between the x-axis ($x_l$) of the lid accelerometer 316 and the x-axis ($x_b$) of the base accelerometer 318 and based on the information related to the acceleration of the movement of the lid portion 302 towards the base portion 304 (acceleration of the lid portion 302 along the z-axis ($z_l$) of the lid accelerometer 316), the computing device 300 can determine that a user is closing the computing device 300. For example, the lid portion 302 can be rotated about a hinge 308, such that the orientation of the $z_l$ axis changes relative to the $z_b$ axis.

For example, the lid accelerometer 316 detects acceleration along the z-axis ($z_l$) of the lid accelerometer 316 (because the lid accelerometer 316 is always moving in a direction that is tangent to the arc on which the accelerometer moves) and determines that the relative angle between the x-axis ($x_l$) of the lid accelerometer 316 and the x-axis ($x_b$) of the base accelerometer 318 is decreasing.

Similarly, based on determining the relative angle between the x-axis ($x_l$) of the lid accelerometer 316 and the x-axis ($x_b$) of the base accelerometer 318 and based on the information related to the acceleration of the movement of the lid portion 302 away from the base portion 304 (acceleration of the lid portion 302 along the z-axis ($z_l$) of the lid accelerometer 316), the computing device 300 can determine that a user is opening the computing device 300. For example, the lid accelerometer 316 detects acceleration along the z-axis ($z_l$) of the lid accelerometer 316 and determines that the relative angle between the x-axis ($x_l$) of the lid accelerometer 316 and the x-axis ($x_b$) of the base accelerometer 318 is increasing. For example, the lid portion 102 can be rotated about the $z_l$ axis relative to the $x_l$ axis, where the $x_l$ axis is parallel to the $x_b$ axis.

Figure 4:
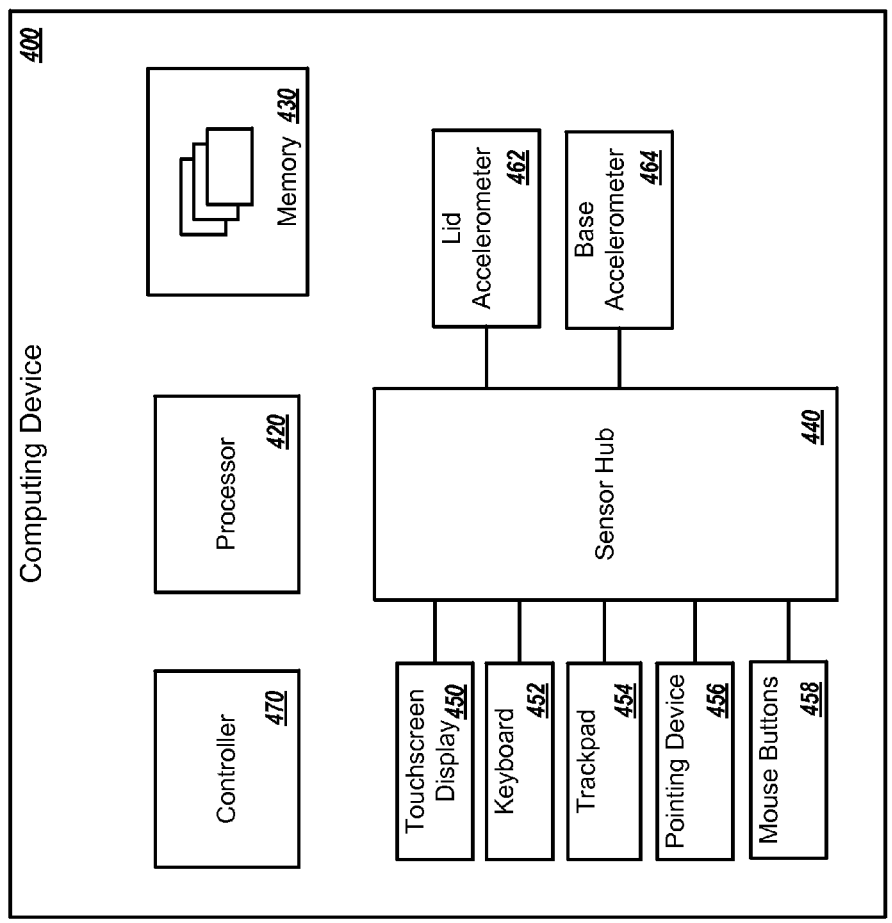
FIG. 4 is a block diagram illustrating example modules included in a computing device.

FIG. 4 is a block diagram illustrating example modules included in a computing device 400. For example, the computing device 400 can be the computing device 100 as shown in FIGS. 1A-B, the computing device 200 as shown in FIGS. 2A-B or the computing device 300 as shown in FIG. 3. In the example of FIG. 4, the computing device 400 includes a processor 420, memory 430, and a sensor hub 440.

The sensor hub 440 can receive input data from one or more input devices. The input devices can be one or more input devices a user of the computing device 400 may interact with in order to provide input to an application running on the computing device 400. For example, the processor 420 may execute an application that may be stored in the memory 430. The application can display a user interface on a touchscreen display 450 included in the computing device 400. The user can interact with one or more input devices in order to interact with and/or provide input to the application. The input devices can include, but are not limited to, the touchscreen display 450, a keyboard 452, a trackpad 454, a pointing device 456, and mouse buttons 458. In addition, the sensor hub 440 can receive input from a lid accelerometer 462 and a base accelerometer 464.

In some implementations, each input device (e.g., input devices 450-458) can be configured to include circuitry and logic to process a physical input received by the respective input device into data that the input device can provide to the sensor hub 440. For example, the touchscreen display 450 can detect pressure at an area (e.g., x-y location) on the touchscreen display 450 as input to an application running on the computing device 400. In another example, the keyboard 452 can detect a user pressing the "a" key on the keyboard and can provide the input of the letter "a" (e.g., a binary representation of the letter "a") to the sensor hub 440. In some implementations, the sensor hub 440 can be configured to include the circuitry and logic to process a physical input received by each of the input devices (e.g., input devices 450-458).

The sensor hub 440 can be configured to include circuitry and logic to process information received from the lid accelerometer 462 and the base accelerometer 464. The lid accelerometer 462 and the base accelerometer 464 can provide acceleration data along an axis of the accelerometer. In addition, the lid accelerometer 462 and the base accelerometer 464 can provide orientation information related to one or more axes of each accelerometer.

In some implementations, a microcontroller 470 can analyze the inputs to sensor hub 440. The microcontroller 470 can analyze the inputs received from the lid accelerometer 462 and the base accelerometer 464 in relation to the inputs received from the touchscreen display 450, the keyboard 452, the trackpad 454, the pointing device 456, and the mouse buttons 458. The microcontroller 470 can determine, based on the received inputs from the lid accelerometer 462 and the base accelerometer 464, that the computing device 400 is in motion (is moving) (e.g., the computing device 400 is being closed, the computing device 400 is being opened, the computing device 400 as a whole is moving). In addition, the microcontroller 470 can determine that the sensor hub 440 is receiving one or more inputs from one or more of the input devices 450-458 while the sensor hub 440 is receiving input from the lid accelerometer 462 and the base accelerometer 464 indicating that the computing device 400 is in motion (is moving). Based on the determined type of motion of the computing device 400 (e.g., the computing device is being closed, the computing device 400 is being opened), the microcontroller 470 can decide not to acknowledge (ignore) the received one or more inputs from the one or more of the input devices 450-458. The microcontroller 470 can determine that the received input is false input.

In some cases, the microcontroller 470 may not provide the received one or more inputs to the processor 420 for use by the application running on the computing device 400 based on determining that the received input if false input. In some implementations, the processor 420 and the microcontroller 470 can analyze the inputs to sensor hub 440 to determine the type of motion and to decide if the received input is false input. Though shown as separate devices in the example in FIG. 4, in some implementations, the processor 420 and the microcontroller 470 may be the same device.

In some implementations, the memory 430 can store historical data related to the use of the computing device 400. The historical data can indicate how and when a user interacted with their computing device 400. For example, the historical data may indicate that shortly after the opening of the computing device 400, an email application was launched or that a high probability exists that an email application is launched shortly after the opening of the computing device 400. In another example, the historical data may indicate that a high probability exists that after the computing device 400 is closed, a user does not interact with the computing device 400 for at least one hour.

In some implementations, the memory 430 can store predictive data related to the use of the computing device 400. The predictive data can predict a state or use of the computing device 400 based on previous historical data for the computing device 400. The predictive data can predict a next state or subsequent use of the computing device 400 based on a current state or use of the computing device 400. For example, the predictive data may indicate that after detecting the opening of the computing device 400, a high probability exists that a short time later an email application is launched. In another example, the predictive data may indicate that after detecting the closing of the computing device 400, the computing device 400 can be placed into a sleep mode. The computing device 400 can determine that the computing device 400 can be placed into a sleep mode based on historical data that indicates a high probability exists that the user does not interact with the computing device 400 for at least one hour after the computing device 400 is closed.

Figure 5:
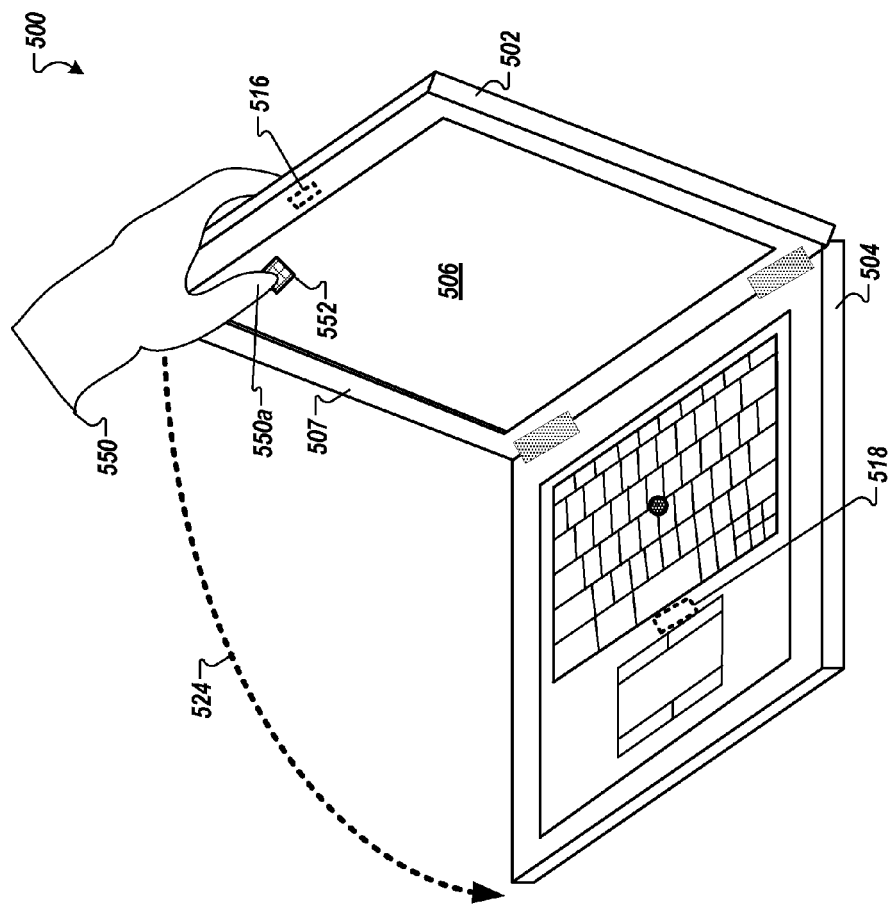
FIG. 5 is a diagram that illustrates an example of a user closing a computing device.

FIG. 5 is a diagram that illustrates an example of a user closing a computing device 500. In the example of FIG. 5, the user can grasp a lid portion 502 of the computing device 500 and move the lid portion 502 towards a base portion 504 of the computing device 500 (using a motion 524) in order to close the computing device 500. When grasping the lid portion 502 of the computing device 500, one or more fingers (e.g., finger 550a) of a hand 550 of the user may contact (touch) a touch-sensitive surface of a display area 506 of the lid portion 502.

In some cases, an application running on the computing device 500 can display an icon 552 on the touch-sensitive surface of the display area 506 of the lid portion 502 of the computing device 500. The icon 552 can be associated with an action that the application can perform when the icon is selected by the user (e.g., the user contacts (touches) the icon with a finger). The touch-sensitive surface of the display area 506 can detect contact of one or more fingers (e.g., finger 550a) of the user with the icon 552. For example, the user touches with a finger (e.g., finger 550a) the location on the touch-sensitive surface of the display area 506 where the icon 552 is displayed. The computing device 500, based on the detected contact of the finger 550a of the user with the icon 552, can perform one or more actions for the application running on the computing device 500 (e.g., close a file, open a file, delete a file, etc.).

In some implementations, as described with reference to FIGS. 1A-B, 3 and 4, the computing device 500 can determine that the user is closing the computing device 500. For example, the computing device 500 can determine that the lid portion 502 is moving towards the base portion 504 of the computing device 500 based on information and data received from a lid accelerometer 516 and a base accelerometer 518. In detecting the motion 524, the computing device 500 can determine that the computing device is being closed. Based on the detection of the closure of the computing device 500, the computing device 500 can transition from a first power state to a second power state where power drawn by the computing device 500 during the second power state is less than the power drawn by the computing device 500 in the first power state.

In addition, while the computing device 500 is detecting the motion 524 (the computing device is being closed), the touch-sensitive surface of the display area 506 can detect a contact of the finger 550a of the user at the icon 552 displayed on the touch-sensitive surface of the display area 506. In this case, the computing device 500 may not perform the one or more actions associated with the application running on the computing device 500 based on the detected contact because when the contact is detected the computing device 500 also determines that the computing device 500 is being closed. As such, the computing device 500 can choose to ignore any input received by the computing device 500 while the computing device 500 is being closed.

A user may inadvertently contact the icon 552 with the finger 550a, selecting the icon 552, while also closing the computing device 500 (moving the lid portion 502 towards the base portion 504 in the motion 524). The touch-sensitive surface of the display area 506 detects the contact and provides the input to the computing device 500. The computing device 500 determines that the input is, for example, the termination of an application currently running on the computing device 500. The computing device 500, based on determining that the user is closing the computing device 500 at the same time the computing device 500 receives the input to terminate the application, ignores the input (identifies the input as false input) and the application continues to run. If the computing device 500 did decide to terminate the application (even though the user inadvertently provided the input to the computing device 500 to do so), the user may have lost data that could be in one or more files used by the application that would have been abruptly closed when the application was terminated.

A user may inadvertently contact the icon 552 with the finger 550a, selecting the icon 552, while also closing the computing device 500 (moving the lid portion 502 towards the base portion 504 in the motion 524). For example, the icon 552 may be a "send" button (indicator) for an electronic mail (email) application running on the computing device 500. The touch-sensitive surface of the display area 506 detects the contact and provides the input to the computing device 500. The computing device 500 determines that the input is, for example, the sending of an email message in an email application currently running on the computing device 500. The computing device 500, based on determining that the user is closing the computing device 500 at the same time the computing device 500 receives the input to send the email message, ignores the input (identifies the input as false input) and does not send the email message.

A user may inadvertently contact the icon 552 with the finger 550a, selecting the icon 552, while also closing the computing device 500 (moving the lid portion 502 towards the base portion 504 in the motion 524). For example, the icon 552 may be a "reply to all" button (indicator) for an electronic mail (email) application running on the computing device 500. The touch-sensitive surface of the display area 506 detects the contact and provides the input to the computing device 500. The computing device 500 determines that the input is, for example, the sending of a reply to all recipients of an email message in an email application currently running on the computing device 500. The computing device 500, based on determining that the user is closing the computing device 500 at the same time the computing device 500 receives the input to reply to all the recipients of the email message, ignores the input (identifies the input as false input) and does not send any replies to the email message.

A user may inadvertently contact the icon 552 with the finger 550a, selecting the icon 552, while also closing the computing device 500 (moving the lid portion 502 towards the base portion 504 in the motion 524). For example, the icon 552 may be a "mute" button (indicator) for an audio application running on the computing device 500. The touch-sensitive surface of the display area 506 detects the contact and provides the input to the computing device 500. The computing device 500 determines that the input is, for example, the muting of the audio output for the computing device 500. The computing device 500, based on determining that the user is closing the computing device 500 at the same time the computing device 500 receives the mute input, ignores the input (identifies the input as false input) and does not mute the audio output for the computing device.

The above examples of ignoring the inadvertent input provided by a user while closing the computing device 500 can prevent the computing device 500 from performing an action that the user may not want to occur and that may have adverse results. For example, the user may experience data loss, inadvertent communications with others, and the placement of the computing device 500 in an unwanted state. Though examples are given of the inadvertent input received while the computing device 500 is being closed, the inadvertent inputs may also be received while a user is opening the computing device 500 or otherwise moving the computing device 500.

As shown in FIG. 5, a bezel 507 can surround the display area 506. In some implementations, the display area 506 and the bezel 507 can each be touch-sensitive. A touch-sensitive area of the lid portion 102 can extend beyond the display area 106 and incorporate all (at least a majority) of the surrounding bezel 507. In some cases, a user may contact an area (touch with a finger) within the touch-sensitive bezel 507 that surrounds the touch-sensitive display area 506. The contact with the touch-sensitive bezel 507 may be determined as an input to the computing device 500. For example, the computing device 500 may be in a first, low power state (e.g., backlighting is turned off and the display area 506 is dimmed). Contacting an area within the touch-sensitive bezel 507 of the computing device 500 can result in the computing device 500 transitioning to a second, higher power state (e.g., turning-on (activating) the backlighting and placing the display area 506 in a full power mode).

The computing device 500 can detect contact in an area within the touch-sensitive bezel 507, while the computing device 500 determines that the computing device is being closed. The computing device 500, based on determining that the user is closing the computing device 500 at the same time the computing device 500 receives the input indicating contact with the touch-sensitive bezel 107, ignores the input (identifies the input as false input). The computing device 500 does not turn-on (activate) the backlighting and the display area 506 of the computing device is not placed in a full power mode. This can be a beneficial response of the computing device 500 to the received inputs because, since the user is closing the computing device 500, the user more than likely would not want to fully activate the computing device 500 on closure.

Figure 6:
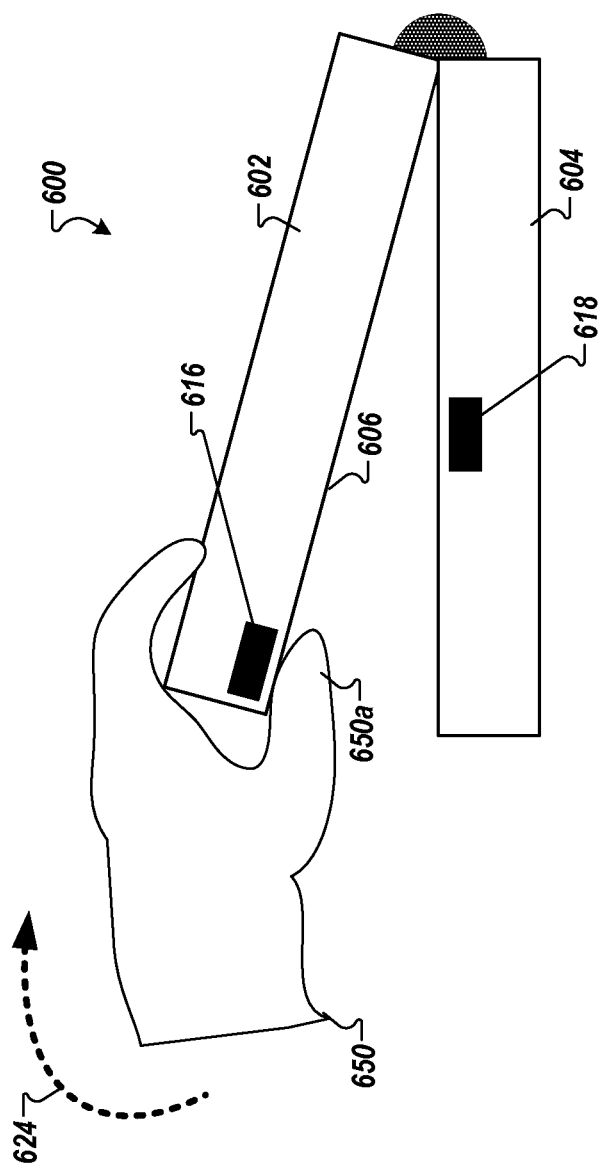
FIG. 6 is a diagram that illustrates an example of a user opening a computing device.

FIG. 6 is a diagram that illustrates an example of a user opening a computing device 600. In the example of FIG. 6, the user can grasp a lid portion 602 of the computing device 600 and move the lid portion 602 away from a base portion 604 of the computing device 600 (using a motion 624) in order to open the computing device 500. When grasping the lid portion 602 of the computing device 600, one or more fingers (e.g., finger 650a) of a hand 650 of the user may contact (touch) a touch-sensitive surface of a display area 606 of the lid portion 602. As described with reference to FIG. 1A, the touch-sensitive surface can essentially encompass the entire surface of the lid portion of a computing device. A bezel can surround the display area 606. A touch-sensitive surface of the lid portion 602 can be defined as incorporating (formed by) the display area 606 and all (at least a majority of) the surrounding bezel.

The touch-sensitive surface of the lid portion 602 can detect contact of one or more fingers (e.g., finger 650a) of the user with the display area 606. The contact can indicate an input to the computing device 600. For example, the user touches with the finger 650a a particular location (area) on the touch-sensitive surface of the lid portion 602. The computing device 600, based on the detected contact of the finger 650a of the user at a particular location on the touch-sensitive surface of the lid portion 602, determines an input to an application running on the computing device 600. The input can be for the application to perform a particular action (e.g., close a file, open a file, delete a file, etc.).

In some implementations, as described with reference to FIGS. 1A-B, 2A-B, 3 and 4, the computing device 600 can determine that the user is opening the computing device 600. For example, the computing device 600 can determine that the lid portion 602 is moving away from the base portion 604 of the computing device 600 based on information and data received from a lid accelerometer 616 and a base accelerometer 618. In addition, while the lid accelerometer 616 and the base accelerometer 618 detect the motion 624, the touch-sensitive surface of the lid portion 602 can detect the contact of the finger 650a of the user at a particular location (area) on the touch-sensitive surface of the lid portion 602. In this case, the computing device 600 may not perform the one or more actions associated with the application running on the computing device 600 based on the detected contact because when the contact is detected the computing device 600 also determines that the computing device 600 is being opened. As such, the computing device 600 can choose to ignore any input received by the computing device 600 while the computing device 600 is being closed.

For example, a user may, by inadvertently contacting a location (area) on the lid portion 602 with a finger 650a, provide input to the computing device 600 for use by an application running on the computing device while also opening the computing device 600 (moving the lid portion 602 away from the base portion 604 in the motion 624). The touch-sensitive surface of the lid portion 602 detects the contact and provides the input to the computing device 600. The computing device 600 determines that the input is, for example, the termination of an application currently running on the computing device 600. In some implementations, the computing device 600, based on determining that the user is opening the computing device 600 at the same time the computing device 600 receives the input to terminate the application, ignores the input (identifies the input as false input) and the application continues to run.

In addition, in some implementations, the computing device 600 can display, in the display area 606, an indication of the contact of the user with the location (area) on the lid portion 602. The computing device 600 can display the indication to the user once the opening of the computing device 600 is completed. The indication can identify an action (operation) selected by the user for input to the computing device 600 based on the detected contact. The user can confirm performing the action (operation) on the computing device 600 by, for example, touching a highlighted location (area) in the display area 606.

Figure 7:
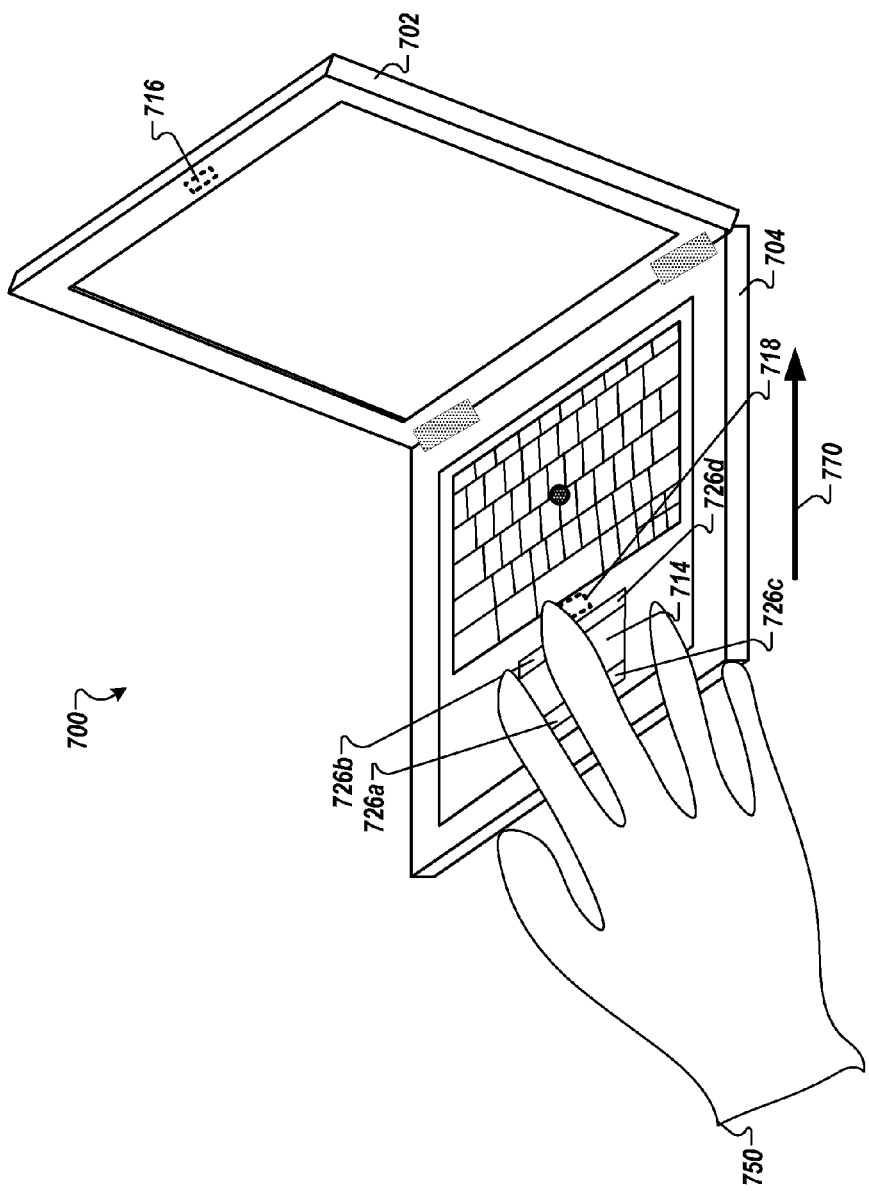
FIG. 7 is a diagram that illustrates an example of a user moving a computing device along a flat surface in a first direction.

FIG. 7 is a diagram that illustrates an example of a user moving a computing device 700 along a flat surface in a first direction. In the example of FIG. 7, the user can place a hand 750 on a base portion 704 of the computing device 700 in order to move the computing device 700 (slide along the flat surface) in a direction as shown by arrow 770. While moving the computing device 700, the user may inadvertently contact (touch with one or more fingers) a trackpad 714 and/or one or more mouse buttons 726a-d with sufficient pressure to be detected as an input by the computing device 700 to, for example, an application running on the computing device 700.

The computing device 700 can determine that the user is moving the computing device 700 based on information and data received from a lid accelerometer 716 and a base accelerometer 718. In addition, while the computing device 700 is detecting the movement of the computing device 700, the computing device 700 can receive the input. The computing device 700 can choose to ignore the input because the computing device 700 received the input was received while it was being moved.

Figure 8:
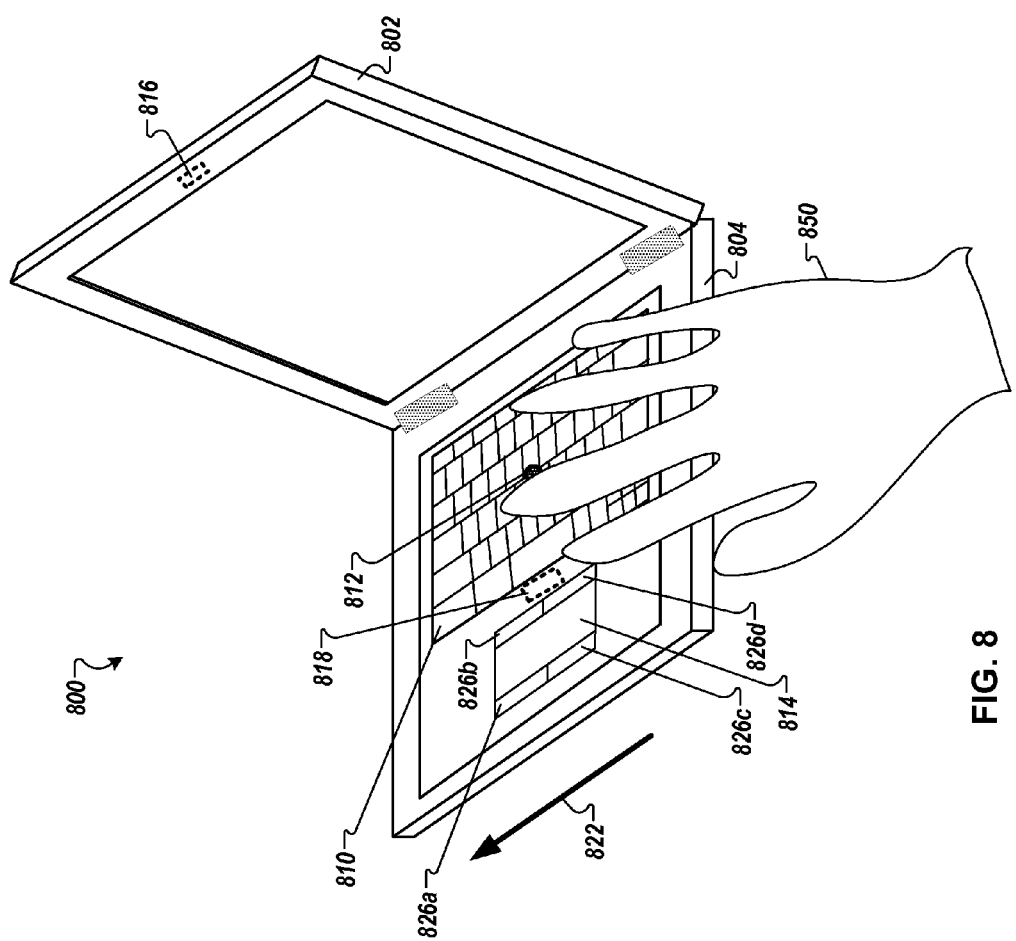
FIG. 8 is a diagram that illustrates an example of a user moving a computing device along a flat surface in a second direction.

FIG. 8 is a diagram that illustrates an example of a user moving a computing device 800 along a flat surface in a second direction. In the example of FIG. 8, the user can place a hand 850 on a base portion 804 of the computing device 800 in order to move the computing device 800 (slide along the flat surface) in a direction as shown by arrow 822. While moving the computing device 800, the user may inadvertently contact (touch with one or more fingers) one or more input devices (e.g., a trackpad 814, one or more mouse buttons 826a-d, one or more keys on a keyboard 810, or a pointing device 812). The user may contact one or more of the input devices with sufficient pressure to be detected as an input by the computing device 800 to, for example, an application running on the computing device 800.

The computing device 800 can determine that the user is moving the computing device 800 based on information and data received from a lid accelerometer 816 and a base accelerometer 818. In addition, while the computing device 800 is detecting the movement of the computing device 800, the computing device 800 can receive the input. The computing device 800 can choose to ignore the input because the computing device 800 received the input was received while it was being moved.

Figure 9:
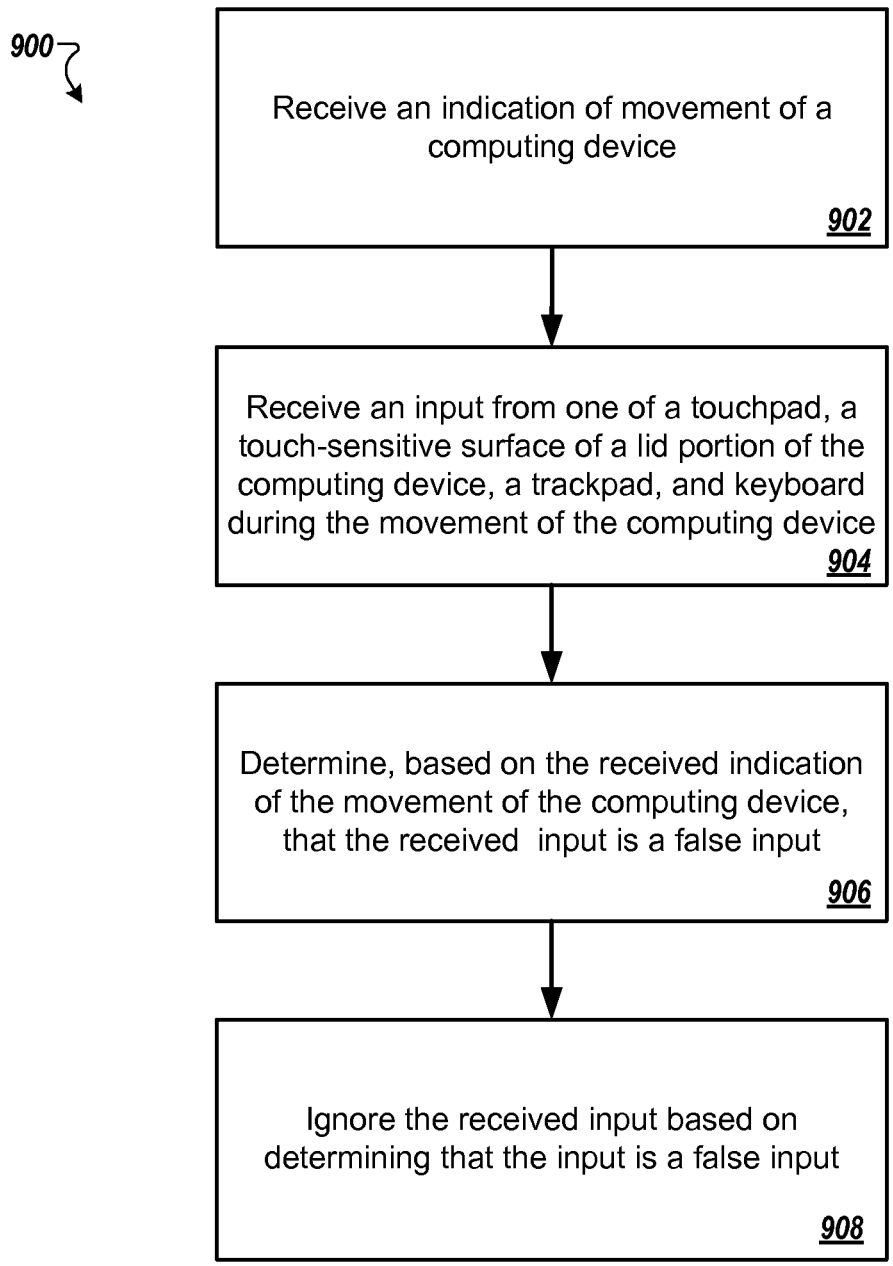
FIG. 9 is a flowchart that illustrates a method of determining false input to a computing device during a detected event.

FIG. 9 is a flowchart that illustrates a method 900 of determining false input to a computing device during a detected event. In some implementations, the method 900 can be implemented by the computing devices described herein.

The method 900 begins by receiving an indication of movement of a computing device (block 902). For example, a computing device can determine that it is in motion. The motion or movement can be of the computing device as a whole. The motion or movement can be one of the lid portion of the computing device moving towards or away from a stationary base portion of the computing device.

An input from one of a touchpad, a touch-sensitive surface of a lid portion of the computing device, a trackpad, and keyboard are received during the movement of the computing device (block 904). For example, an input area of the computing device can include one or more input devices such as a touchpad, a touch-sensitive surface of a lid portion of the computing device, a trackpad, and keyboard. A user may inadvertently contact one or more of the input devices while the motion and/or movement of the computing device is also occurring.

Based on the received indication of the movement of the computing device, it is determined that the received input is a false input (block 906). Because the computing device is moving or is subject to some type of motion (e.g., opening the computing device, closing the computing device, the computing device is being dropped, the computing device is moving along a flat surface) the received input is considered by the computing device to be false input to the computing device.

Based on determining that the input is a false input, the received input is ignored (block 908). The computing device ignores the received input, for example, by not providing the input to an application running on the computing device. By not providing the received input to the application, the application may not perform an action that is associated with the received false input. In some cases, the application can remain in its current state.

Figure 10:
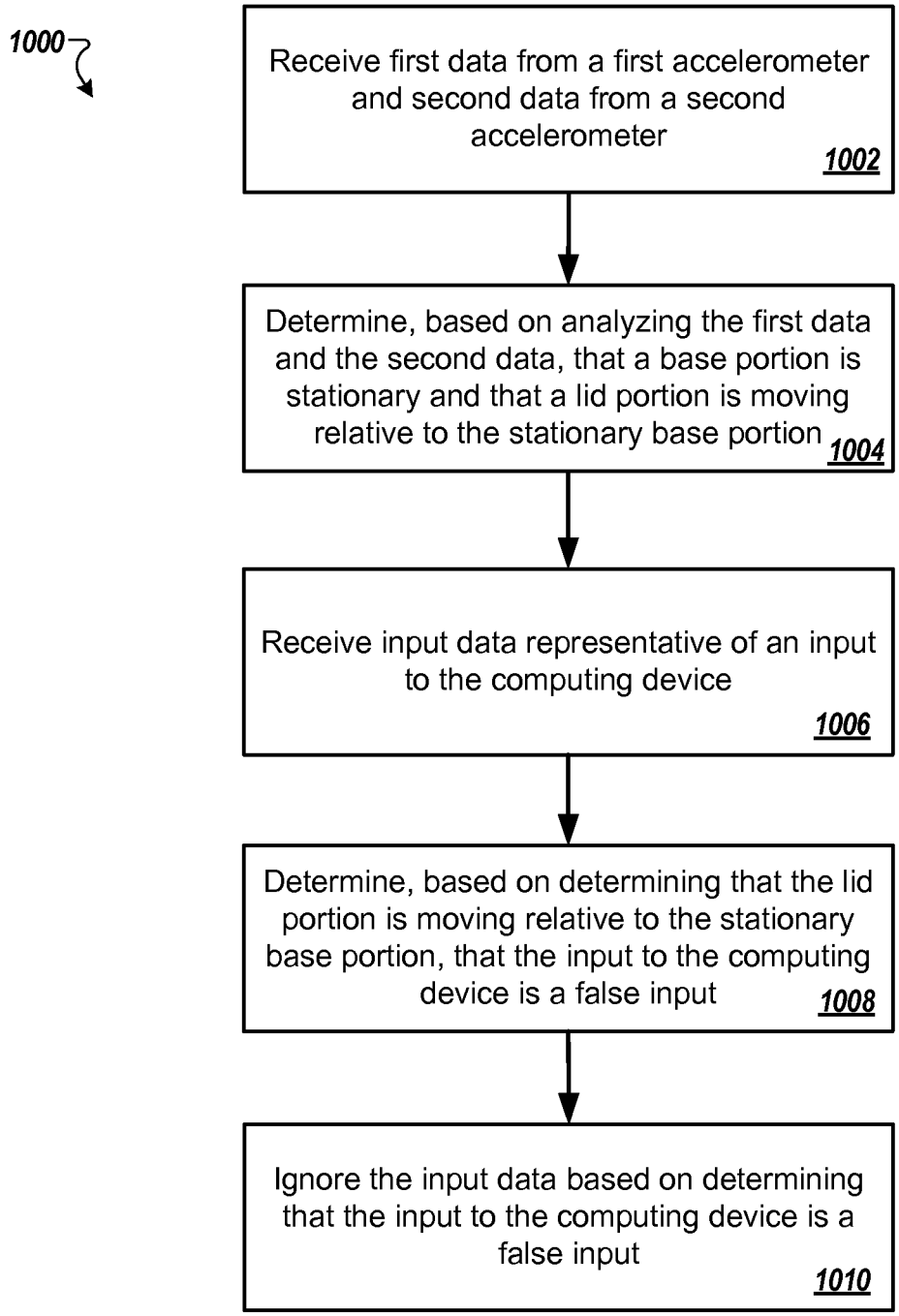
FIG. 10 is a flowchart that illustrates a method of determining false input to a computing device.

FIG. 10 is a flowchart that illustrates a method 1000 of determining false input to a computing device. In some implementations, the method 1000 can be implemented by the computing devices described herein.

The method 1000 begins by receiving first data from a first accelerometer and second data from a second accelerometer. For example, a computing device can include a lid accelerometer (a first accelerometer included in a lid portion of the computing device) and a base accelerometer (a second accelerometer included in a base portion of the computing device). The first accelerometer and the second accelerometer can be used to detect motion and/or movement of the computing device as a whole. The first accelerometer and the second accelerometer can be used to detect motion and/or movement of the lid portion of the computing device relative to the base portion of the computing device and the movement of the base portion of the computing device relative to the lid portion of the computing device.

Based on analyzing the first data and the second data, it is determined that the base portion is stationary and that the lid portion is moving relative to the stationary base portion (block 1004). The computing device analyzes the first data and the second data and determines that the lid portion is accelerating along a z-axis and the base portion is not accelerating along any axis. For example, in addition, the computing device determines that an angle between the lid portion and the base portion of the computing device is increasing, indicating the computing device is being opened. In another example, in addition, the computing device determines that an angle between the lid portion and the base portion of the computing device is decreasing, indicating the computing device is being closed.

Input data representative of an input to the computing device is received (block 1006). For example, the base portion of the computing device can include an input area. The input area can include one or more input devices such as a touchpad, a touch-sensitive surface of a lid portion of the computing device, a trackpad, and keyboard. In addition, the lid portion of the computing device can incorporate a touch-sensitive surface that defines (forms) the majority of the surface of the lid portion. A user may inadvertently contact one or more of the input devices in the base portion of the computing device and/or make inadvertant contact with the touch-sensitive surface of the lid portion while the motion and/or movement of the computing device is also occurring.

The input to the computing device is determined to be a false input based on determining that the lid portion is moving relative to the stationary base portion (block 1008). Because the computing device is being opened (the lid portion is moving away from the stationary base portion) or is being closed (the lid portion is moving towards the base portion) the received input is considered by the computing device to be false input to the computing device.

Based on determining that the input is a false input the received input is ignored by the computing device (block 1010). The computing device ignores the received input, for example, by not providing the input to an application running on the computing device. By not providing the received input to the application, the application may not perform an action that is associated with the received false input. In some cases, the application can remain in its current state.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semi-conductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   receiving, by a computing device, an indication of movement of the computing device including:
     receiving first data from a first accelerometer included in a lid portion of the computing device; and
     receiving second data from a second accelerometer included in a base portion of the computing device;
   receiving, by the computing device, an input from one of a touchpad, a touch-sensitive surface of the lid portion of the computing device, a trackpad, one or more mouse buttons, and a keyboard during the movement of the computing device;
   analyzing the first data and the second data;
   determining, based on analyzing the first data and the second data, that the lid portion of the computing device is moving relative to the base portion of the computing device;
   determining, based on the received indication of the movement of the computing device, that the received input is a false input; and
   ignoring, by the computing device, the received input based on determining that the received input is a false input.

2. The method of claim 1, further comprising:
   determining, based on determining that the lid portion of the computing device is moving relative to the base portion of the computing device, that the movement of the computing device is a closing of the computing device.

3. The method of claim 2, further comprising:
   determining, based on analyzing the first data and second data, that the base portion of the computing device is stationary and in a horizontal position.

4. The method of claim 1, further comprising:
   determining, based on determining that the lid portion of the computing device is moving relative to the base portion of the computing device, that the movement of the computing device is an opening of the computing device.

5. The method of claim 4, further comprising:
   determining, based on analyzing the first data and the second data, that the base portion of the computing device is stationary and in a horizontal position.

6. A method, comprising:
   receiving, by a computing device, an indication of movement of the computing device including:
     receiving first data from a first accelerometer included in a lid portion of the computing device; and
     receiving second data from a second accelerometer included in a base portion of the computing device;
   receiving, by the computing device, an input from one of a touchpad, a touch-sensitive surface of the lid portion of the computing device, a trackpad, one or more mouse buttons, and a keyboard during the movement of the computing device;
   analyzing the first data and the second data;
   determining, based on analyzing the first data and the second data, that the lid portion of the computing device and the base portion of the computing device are accelerating at the same rate;
   determining, based on the received indication of the movement of the computing device, that the received input is a false input; and
   ignoring, by the computing device, the received input based on determining that the received input is a false input.

7. A computing device comprising:
   a lid portion including a first accelerometer and a touch-sensitive surface, the touch-sensitive surface including a touch-sensitive bezel and a touch-sensitive display area, wherein the touch-sensitive bezel at least partially overlaps the touch-sensitive display area;
   a base portion coupled to the lid portion and including a second accelerometer; and
   a non-transitory computer-readable medium having instructions stored thereon, the instructions, when executed by a processor, causing at least one processor of the computing device to perform operations comprising:
     receiving first data from the first accelerometer and second data from the second accelerometer;
     determining, based on analyzing the first data and the second data, that the base portion is stationary and that the lid portion is moving relative to the base portion;
     receiving, from the touch-sensitive surface, input data representative of an input to the computing device;
     determining, based on determining that the lid portion is moving relative to the base portion, that the input to the computing device is a false input; and
     ignoring the input data based on determining that the input to the computing device is a false input.

8. The computing device of claim 7, wherein receiving, from the touch-sensitive surface, input data representative of an input to the computing device comprises receiving input data representative of an input to the computing device that would cause an application executing on the computing device to perform an action; and wherein ignoring the input data comprises preventing the application from performing the action.

9. The computing device of claim 7, wherein receiving, from the touch-sensitive surface, input data representative of an input to the computing device comprises receiving input data representative of an input to the computing device that would cause an application to begin executing on the computing device; and wherein ignoring the input data comprises preventing the application from executing.

10. The computing device of claim 7, the operations further comprising:
  measuring a change in an angle of movement of the lid portion relative to the stationary base portion; and
  determining, based on the measured change in the angle of movement, that the lid portion is being rotated about an axis relative to the base portion.

11. The computing device of claim 10, wherein determining, based on the measured change in the angle of movement, that the lid portion is being rotated about an axis relative to the base portion comprises determining that the computing device is being closed.

12. The computing device of claim 11, wherein the computing device is transitioned from a first power state to a second, lower power state once the computing device is closed.

13. The computing device of claim 10, wherein determining, based on the measured change in the angle of movement, that the lid portion is being rotated about an axis relative to the base portion comprises determining that the computing device is being opened.

14. The computing device of claim 13, wherein the computing device is transitioned from a first power state to a second, higher power state once the computing device is opened.

15. A computing device comprising:
  a lid portion including a first accelerometer;
  a base portion coupled to the lid portion and including a second accelerometer and one or more input devices; and
  a non-transitory computer-readable medium having instructions stored thereon, the instructions, when executed by a processor, causing at least one processor of the computing device to perform operations comprising:
    receiving first data from the first accelerometer and second data from the second accelerometer;
    determining, based on analyzing the first data and the second data, that the base portion is stationary and that the lid portion is moving relative to the stationary base portion;
    receiving, from a one of the one or more input devices, input data representative of an input to the computing device;
    determining, based on determining that the lid portion is moving relative to the stationary base portion, that the input to the computing device is a false input; and
    ignoring the input data based on determining that the input to the computing device is a false input.

16. The computing device of claim 15, wherein the one or more input devices include a touchpad, a trackpad, one or more mouse buttons, and a keyboard.

17. The computing device of claim 15, wherein receiving, from a one of the one or more input devices, input data representative of an input to the computing device comprises receiving input data representative of an input to the computing device that would cause an application executing on the computing device to perform an action; and wherein ignoring the input data comprises preventing the application from performing the action.

18. The computing device of claim 15, wherein receiving, from a one of the one or more input devices, input data representative of an input to the computing device comprises receiving input data representative of an input to the computing device that would cause an application to begin executing on the computing device; and wherein ignoring the input data comprises preventing the application from executing.

19. The computing device of claim 15, the operations further comprising:
  measuring a change in an angle of movement of the lid portion relative to the stationary base portion; and
  determining, based on the measured change in the angle of movement, that the lid portion is being rotated about an axis relative to the base portion.

20. The computing device of claim 19, wherein determining, based on the measured change in the angle of movement, that the lid portion is being rotated about an axis relative to the base portion comprises determining that the computing device is being closed.

21. The computing device of claim 20, wherein the computing device is transitioned from a first power state to a second, lower power state once the computing device is closed.

22. The computing device of claim 19, wherein determining, based on the measured change in the angle of movement, that the lid portion is being rotated about an axis relative to the base portion comprises determining that the computing device is being opened.

23. The computing device of claim 22, wherein the computing device is transitioned from a first power state to a second, higher power state once the computing device is opened.

* * * * *